United States Patent [19]
Giese

[11] Patent Number: 5,599,245
[45] Date of Patent: Feb. 4, 1997

[54] BELT TENSIONER WITH LAMELLAR SLIDING BEARING RING

[75] Inventor: Peter Giese, Herzogenaurach, Germany

[73] Assignee: INA Wälzlager Schaeffler KG, Herzogenaurach, Germany

[21] Appl. No.: 511,946

[22] Filed: Aug. 7, 1995

[30] Foreign Application Priority Data

Aug. 12, 1994 [DE] Germany .................. 44 28 560.4

[51] Int. Cl.⁶ .................. F16H 7/08; F16H 7/16
[52] U.S. Cl. .................. 474/135
[58] Field of Search .................. 474/135, 101, 474/109–111, 117, 133

[56] References Cited

U.S. PATENT DOCUMENTS

| 4,886,484 | 12/1989 | Hanes .................. 474/135 |
| 5,149,306 | 9/1992 | Sidwell et al. .................. 474/135 |
| 5,458,541 | 10/1995 | Adler et al. .................. 474/135 |
| 5,503,599 | 4/1996 | Brehler et al. .................. 474/135 |

FOREIGN PATENT DOCUMENTS

| 0306180 | 3/1989 | European Pat. Off. . |
| 3637103 | 5/1988 | Germany . |
| 3912944 | 9/1990 | Germany . |
| 4001689 | 9/1991 | Germany . |
| 4029940 | 3/1992 | Germany . |

Primary Examiner—Stephen J. Novosad
Attorney, Agent, or Firm—Panitch Schwarze Jacobs & Nadel, P.C.

[57] ABSTRACT

In a belt or chain tensioner a sliding bearing ring is arranged between an element rigidly connected to the housing and an element rigidly connected to the tension arm. In order to achieve an improved damping, the sliding bearing ring is provided at one place with a through-slot into which engages a projection on one of the two elements. In addition, the sliding bearing ring is preferably provided with at least two, and preferably more, axially oriented grooves which define narrow and flexible lamellae formed between them. The lamellae are inclined with respect to and bear against a facing peripheral surface of one of the two elements in order to obtain a direction-dependent damping, since the lamellae are easily pushed aside in one direction of rotation but are entrained and pushed up into an upright position in the opposite direction of rotation.

5 Claims, 2 Drawing Sheets

BELT TENSIONER WITH LAMELLAR SLIDING BEARING RING

FIELD OF THE INVENTION

The invention concerns a tensioner for traction means such as belts and chains, comprising, a tension arm carrying a tension roller for the traction means, the tension arm being urged against the traction means by a spring supported on a housing, the tensioner further comprising a pivoting axle rigidly connected to the housing, while the tension arm is pivotally mounted on the pivoting axle using a sliding bearing ring arranged in an annular space which is defined radially between an element rigidly connected to the housing and an element rigidly connected to the tension arm.

BACKGROUND OF THE INVENTION

Such a tensioner is known, for example, from EP-A 03 06 180. The sliding bearing ring arranged in the annular space is loaded so that a damping moment acts between the two elements rigidly connected to the housing and the tension arm, respectively. The damping moment is influenced by the belt tension.

It is an object of the invention to further improve damping in a tensioner of this generic type.

SUMMARY OF THE INVENTION

The invention achieves this object by the fact that the sliding bearing ring comprises a through-slot into which engages a projection on one of the element rigidly connected to the housing and the element rigidly connected to the tension arm.

An advantage of the tensioner of the invention is that during pivoting of the tension arm, the projection, arranged for example on the tension arm, abuts against an end of the sliding bearing ring defining the slot, and thus entrains the sliding bearing ring. The sliding bearing ring is thus pushed along ahead of the projection and is thereby pressed radially against one of the two said elements thus leading to an increase of friction. The slot serves on the one hand for positive entrainment by the projection and promotes, on the other hand, the described pushing effect.

In a particularly advantageous embodiment of the invention, a periphery of the sliding bearing ring comprises at least two, preferably axially oriented grooves which define a narrow and flexible lamella formed therebetween which is inclined with respect to, and bears against the facing peripheral surface of the element rigidly connected to the tension arm or of the element rigidly connected to the housing, as the case may be. The advantage of this embodiment is that no additional components are required for obtaining a desired direction-dependent damping, but the appropriate configuration of the lamellae of the sliding bearing ring suffices therefor.

The lamellae may be formed optionally on the inner or the outer periphery of the sliding bearing ring. If the lamellae are formed on the inner periphery, for example, their free ends bear against the peripheral surface of the element rigidly connected to the tension arm or of the element rigidly connected to the housing. In one direction of pivot of the tension arm, the lamellae are pushed aside elastically so that their radial dimension is reduced. In the other pivoting direction of the tension arm, the lamellae are entrained due to the friction between the lamellae and the element rigidly connected to the tension arm or the element rigidly connected to the housing, as the case may be, and the lamellae come into an upright position whereby their radial dimension is increased. With this increase in radial dimension, the radial pressure of the sliding bearing ring also increases so that a higher damping is obtained than in the other pivoting direction.

In a tensioner in which the element rigidly connected to the tension arm is a bushing in which the pivoting axle is concentrically arranged and wherein the spring is a coiled torsion spring arranged inside the pivoting axle, this pivoting axle is advantageously also made in the form of a bushing. In such a tensioner, the main components can be manufactured without chip removal, for example by deep drawing.

In another advantageous embodiment of the invention, a plurality of lamellae are arranged on one half of the periphery of the sliding bearing ring. If required, the half concerned can be chosen so that the element rigidly connected to the tension arm is pushed away from the lamellae during pivoting of the tension arm in a direction tending to relax the traction means.

BRIEF DESCRIPTION OF THE DRAWINGS

The foregoing summary, as well as the following detailed description of preferred embodiments of the invention, will be better understood when read in conjunction with the appended drawings which show further features and advantages of the invention. For the purpose of illustrating the invention, there are shown in the drawings embodiments which are presently preferred. It should be understood, however, that the invention is not limited to the precise arrangements and instrumentalities shown. It can also include combinations of individual features shown, described and/or claimed. In the drawings:

DETAILED DESCRIPTION OF PREFERRED EMBODIMENTS

Figure 1:
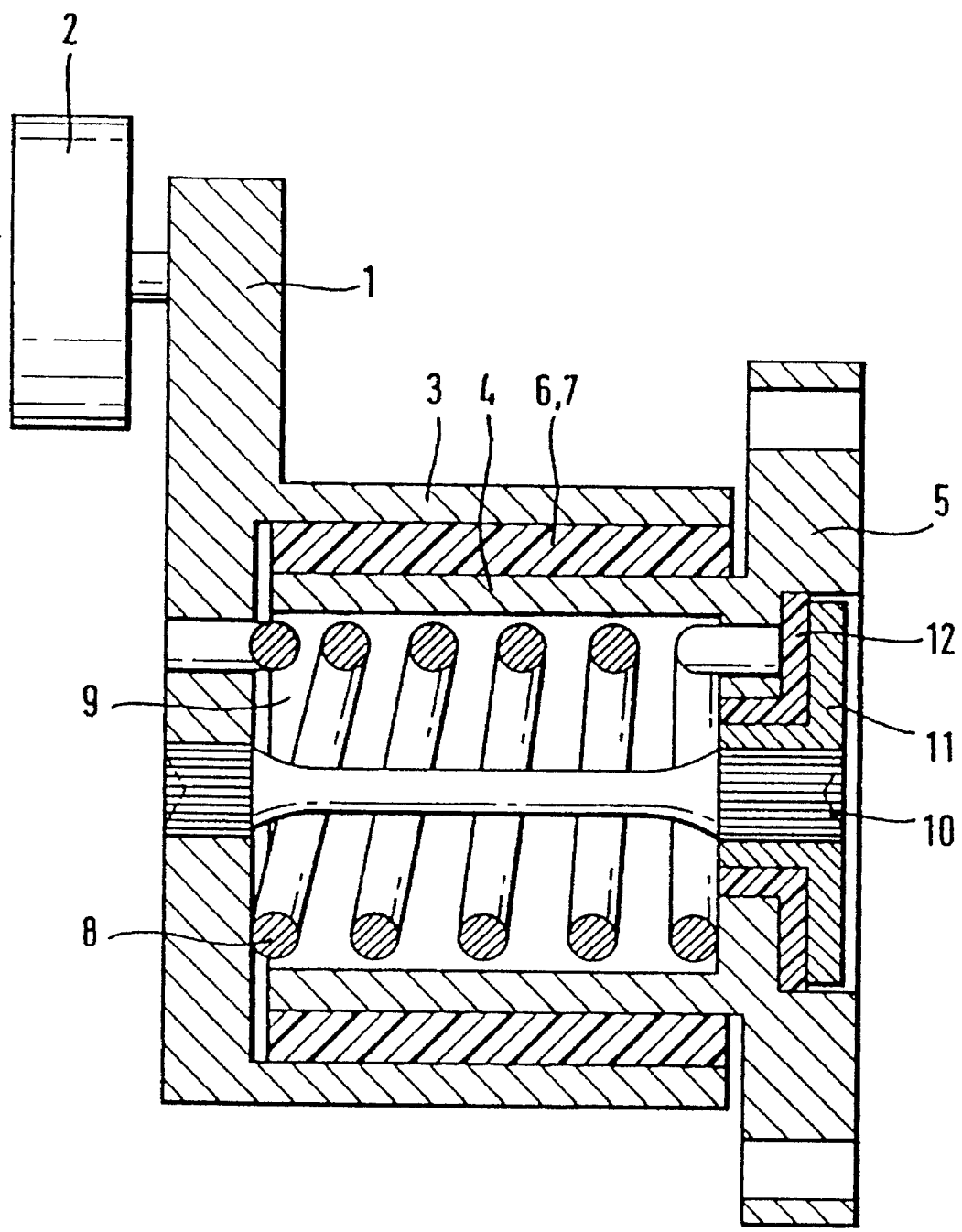
FIG. 1 is a longitudinal cross-section through a tensioner of the invention.

In a tensioner of the invention shown in FIG. 1, a tension arm 1 carries a tension roller 2 which bears against a belt, not shown. A bushing 3 formed integrally on the tension arm 1 concentrically surrounds a pivoting axle 4 of a housing 5. A sliding bearing ring 7 is arranged in an annular space 6 defined by the bushing 3 and the pivoting axle 4. The ends of a coiled torsion spring 8 are fixed respectively on the tension arm 1 and the housing 5. The coiled torsion spring 8 is enclosed in a space 9 defined at its opposing ends by the tension arm 1 and the housing 5, and circumferentially by the pivoting axle 4. The ends of a torsion bar 10, which is arranged concentrically with the pivoting axle 4, are fixed respectively on the tension arm 1 and on a radial flange 11, a friction disc 12 being disposed between this radial flange 11 and the housing 5. The friction disc 12 is restrained axially due to the axial force component of the coiled torsion spring 8.

Figure 2:
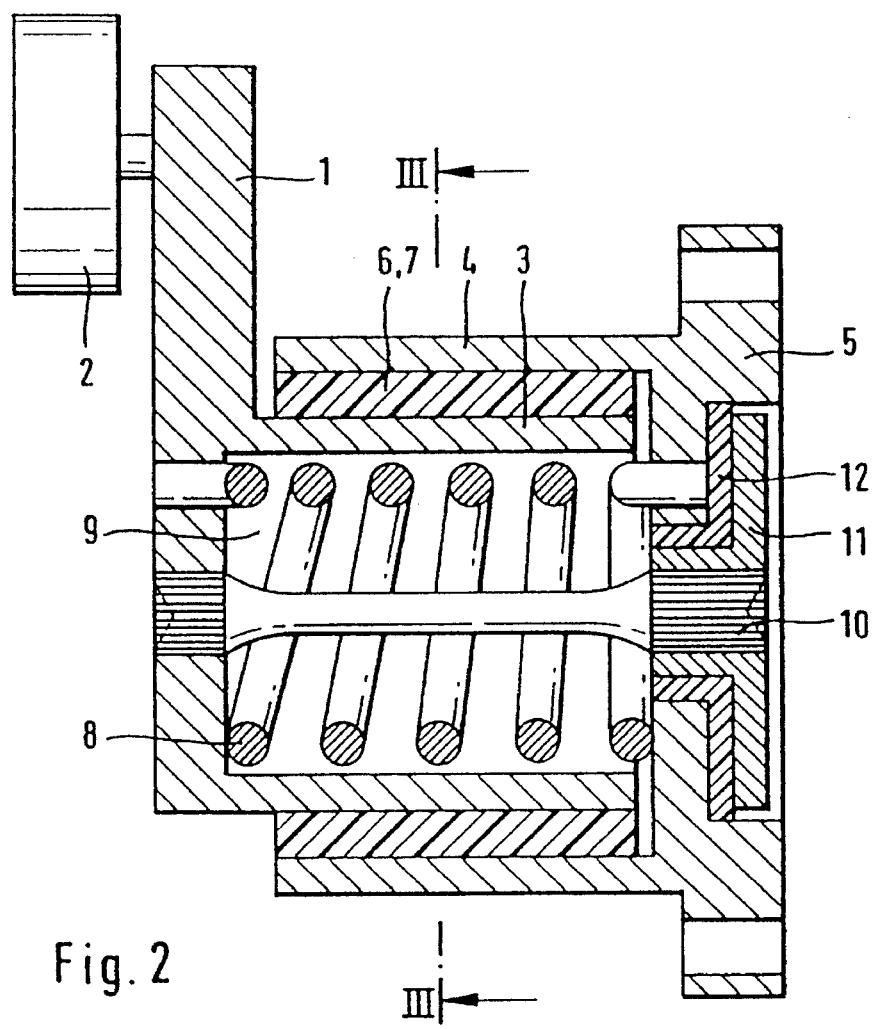
FIG. 2 is a longitudinal cross-section through another embodiment of the tensioner of the invention.

The tensioner of the invention shown in FIG. 2 differs from that of FIG. 1 only in that the bushing 3 is arranged within, instead of around the pivoting axle 4.

Figure 3:
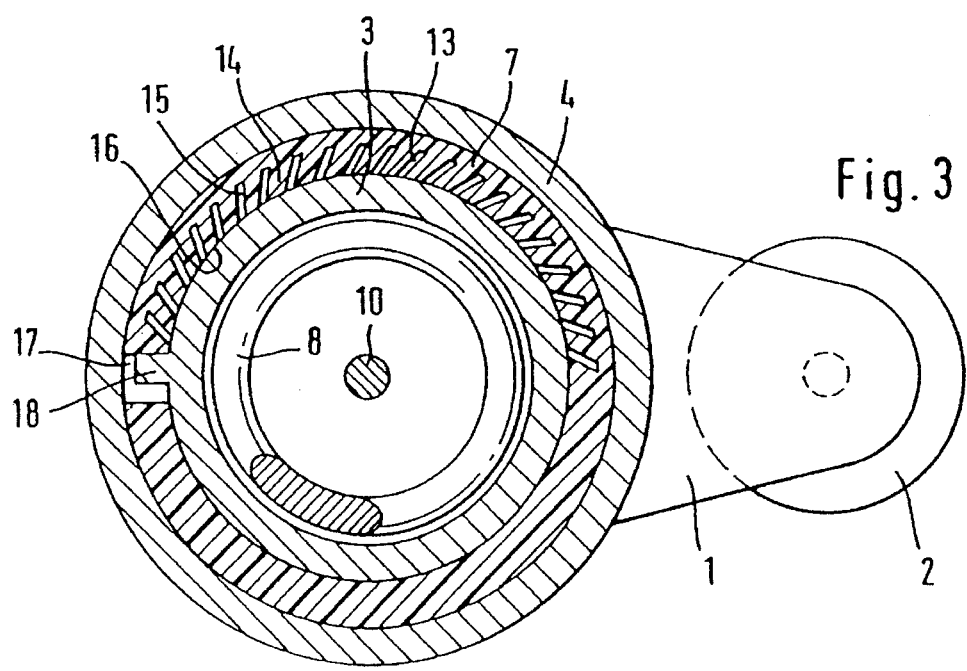
FIG. 3 is a cross-section taken along line III—III of FIG. 2.

FIG. 3 shows the tensioner of the invention in a cross-sectional view. A plurality of axially oriented grooves 13 are arranged over half the inner periphery of the sliding bearing ring 7. A lamella 14 is defined between every two adjacent grooves 13 whose groove walls 15 facing adjacent grooves 13 are parallel to each other. The lamellae 14 thus formed are inclined from the normal with respect to the peripheral surface of the bushing 3. In the present embodiment, this means that the center lines, not shown, of the lamellae extend tangentially to a fictitious circle which is concentric with the bushing 3. The end faces 16 of the free ends of the lamellae 14 bear against the peripheral surface of the bushing 3. Further, the sliding bearing ring 7 has at one place a through-slot 17 into which a radially projecting lug 18 of the bushing 3 engages with circumferential play.

The sliding bearing ring 7 may be made of a plastic material, such as PA 66 (polyamide or nylon), with or without additives, such as for optimizing the high temperature properties of the bearing. Such materials are well known to those skilled in the art of bearing manufacture. The thickness of the lamellae will vary depending upon a number of factors, such as bearing material, construction of the belt tensioner, acting forces, desired degree of damping effect, etc., and will be readily determined by one skilled in the art based on such factors.

The mode of operation of the tensioner of the invention is as follows: During rotation of the tension arm 1 in an anti-clockwise direction, the bushing 3 is rotated relative to the pivoting axle 4 whereby the lamellae 14 are pressed in a direction causing a reduction of their overall radial height, that is to say, a reduction of the overall radial height of the sliding bearing ring 7. If, however, the tension arm 1 is rotated in a clockwise direction, radial friction forces transmitted between the sliding bearing ring 7 and the peripheral surfaces of the pivoting axle 4 and the bushing 3 cause the lamellae to come into an upright position which leads to an increase of the overall radial height of the sliding bearing ring 7. This is accompanied by an increase of the friction forces between the sliding bearing ring 7 and the peripheral surfaces of the pivoting axle 4 and the bushing 3. Therefore, the damping effect in this direction of rotation of the tension arm 1 is higher than in the opposite direction of rotation. The lug 18 guarantees a reliable entrainment of the sliding bearing ring 7 by the bushing 3 by pushing the sliding bearing ring 7 ahead as it itself moves. This pushing action causes a radial displacement of the sliding bearing ring 7 leading to an increase of friction due to the increased contact pressure of the sliding bearing ring 7.

Another possible obvious embodiment of the invention would be to make the pivoting axle and the bushing conical in shape so that they define a conical annular space, in which case, the sliding bearing ring arranged therein would also have a conical configuration.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A tensioner for traction means such as belts and chains, comprising a tension arm (1) carrying a tension roller (2) for the traction means, said tension arm (1) being urged against the traction means by a spring (8) supported on a housing (5), the tensioner further comprising a pivoting axle (4) rigidly connected to the housing (5), while the tension arm (1) is pivotally mounted on the pivoting axle using a sliding bearing ring (7) arranged in an annular space (6) which is defined radially between a first element rigidly connected to the housing (5) and a second element rigidly connected to the tension arm (1), wherein the sliding bearing ring (7) has a through-slot (17) into which a projection (18) on one of the first element and the second element engages.

2. The tensioner according to claim 1, wherein a periphery of the sliding bearing ring (7) comprises at least two axially oriented grooves (13) which define a narrow and flexible lamella (14) formed therebetween which is inclined with respect to, and bears against a facing peripheral surface of one of the second element and the first element.

3. The tensioner according to claim 2, wherein a plurality of lamellae (14) are arranged on one half of the periphery of the sliding bearing ring (7).

4. The tensioner according to claim 1, wherein the second element is a bushing (3) in which the pivoting axle (4) is concentrically arranged, the spring is a coiled torsion spring (8) arranged inside the pivoting axle (4), and the pivoting axle is configured as a bushing (4).

5. The tensioner according to claim 4, wherein the first element is said pivoting axle (4).

* * * * *